United States Patent
Bhatt et al.

(10) Patent No.: US 9,456,001 B2
(45) Date of Patent: Sep. 27, 2016

(54) ATTACK NOTIFICATION

(71) Applicant: Hewlett-Packard Development Company, L.P., Houston, TX (US)

(72) Inventors: Sandeep N. Bhatt, Madison, NJ (US); Tomas Sander, New York, NY (US); Anurag Singla, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 229 days.

(21) Appl. No.: 13/755,007

(22) Filed: Jan. 31, 2013

(65) Prior Publication Data
US 2014/0215616 A1    Jul. 31, 2014

(51) Int. Cl.
*H04L 29/06* (2006.01)
*G06F 21/55* (2013.01)

(52) U.S. Cl.
CPC ......... *H04L 63/1441* (2013.01); *G06F 21/554* (2013.01); *H04L 63/145* (2013.01); *H04L 63/1408* (2013.01); *H04L 63/1416* (2013.01); *H04L 63/1466* (2013.01)

(58) Field of Classification Search
CPC ........... H04L 63/1416; H04L 63/1408; H04L 63/145; H04L 63/1441; H04L 63/1466; G06F 21/554
USPC .................................................... 726/22–25
See application file for complete search history.

(56) References Cited

U.S. PATENT DOCUMENTS

| | | |
|---|---|---|
| 6,807,569 B1 | 10/2004 | Bhimani et al. |
| 7,461,036 B2 | 12/2008 | Genty et al. |
| 7,594,224 B2 | 9/2009 | Patrick et al. |
| 7,779,119 B2 | 8/2010 | Ginter et al. |
| 7,784,097 B1 | 8/2010 | Stolfo et al. |
| 7,841,008 B1 | 11/2010 | Cole et al. |
| 7,953,846 B1 | 5/2011 | Amoroso et al. |
| 7,996,888 B2 | 8/2011 | Asunmaa et al. |

(Continued)

OTHER PUBLICATIONS

Abdulrahman, "Investigating the Technological and Practical Levels of Maturity of the Industry to Implement Web Services Security", Masters Thesis for: Department of Numerical Analysis and Computer Science, Stockholm Royal Institute of Technology, Oct. 2005, 92 pages.

(Continued)

*Primary Examiner* — Morshed Mehedi
*Assistant Examiner* — Ayoub Alata
(74) *Attorney, Agent, or Firm* — Brooks, Cameron & Huebsch, PLLC

(57) ABSTRACT

Systems, methods, and machine-readable and executable instructions are provided for attack notification. Attack notification can include receiving security-related data from a number of computing devices that are associated with a number of entities through a communication link and analyzing a first portion of the security-related data that is associated with a first entity from the number of entities to determine whether the first entity has experienced an attack. Attack notification can include analyzing a second portion of the security-related data that is associated with a second entity from the number of entities and the first portion of the security-related data that is associated with the first entity to determine whether the second entity is experiencing the attack. Attack notification can include notifying, through the communication link, the second entity that the second entity is experiencing the attack if it is determined that the second entity is experiencing the attack.

20 Claims, 5 Drawing Sheets

(56) References Cited

U.S. PATENT DOCUMENTS

| | | | |
|---|---|---|---|
| 8,065,725 | B2 | 11/2011 | Zheng et al. |
| 8,204,813 | B2 | 6/2012 | Merkoulovitch et al. |
| 8,286,239 | B1 | 10/2012 | Sutton |
| 8,327,442 | B2 | 12/2012 | Herz et al. |
| 2001/0052014 | A1* | 12/2001 | Sheymov ............ H04L 63/1408 709/225 |
| 2005/0102534 | A1 | 5/2005 | Wong |
| 2006/0069912 | A1* | 3/2006 | Zheng ................. H04L 63/0823 713/151 |
| 2007/0169171 | A1 | 7/2007 | Kumar et al. |
| 2008/0172382 | A1 | 7/2008 | Prettejohn |
| 2010/0064039 | A9* | 3/2010 | Ginter et al. ................. 709/224 |
| 2010/0299292 | A1 | 11/2010 | Collazo |
| 2011/0153383 | A1 | 6/2011 | Bhattacharjya et al. |
| 2011/0161069 | A1 | 6/2011 | Staffel |
| 2011/0173699 | A1 | 7/2011 | Figlin et al. |
| 2011/0239270 | A1 | 9/2011 | Sovio et al. |
| 2011/0302653 | A1 | 12/2011 | Lloyd et al. |
| 2012/0072983 | A1 | 3/2012 | McCusker et al. |
| 2012/0216282 | A1* | 8/2012 | Pappu ................. H04L 63/1416 726/23 |
| 2012/0233698 | A1 | 9/2012 | Watters et al. |
| 2012/0246730 | A1 | 9/2012 | Raad et al. |

OTHER PUBLICATIONS

Ben-Shalom, et al., "Granular Trust Model Improves Enterprise Security", www.intel.com/IT, Intel Corporation, Nov. 2012, 8 pages.
Zhou, et al., "Modeling Network intrusion Detection Alerts for Correlation", ACM Transactions on Information and System Security, vol. 10, No. 1, Article 4, Feb. 2007, 31 pages.
Unknown., "Monitoring, Analysis, and Correlation" Accessed via: http http://www.cisco.com/en/US/docs/solutions/Enterprise/Security/SAFE_RG/chap10.html, Dec. 2012, 26 pages.
Unknown., "Real-Time Threat Management—Securing Your Journey to the Cloud", Trend Micro, Jun. 2011, 2 pages.
Kaplan, Dan., "Sharing the pie: Threat Collaboration", Accessed via: http://www.scmagazine.com/sharing-the-pie-threat-collaboration/article/250421/, SC Magazine, Aug. 1, 2012, 3 pages.
Unknown., "AlienVault Open Threat Exchange" Dec. 2012, 2 pages.
Phillips, et al., "Information Sharing and Security in Dynamic Coalitions," Jun. 2002, 16 pages.
Fokoue, et al., "A Decision Support System for Secure Information Sharing," The 14th ACM Symposium on Access Control Models and Technologies SACMAT'09, Jun. 3-5, 2009, Stresa, Italy, 10 pages.
Evans, et al., "Context-derived Pseudonyms for Protection of Privacy in Transport Middleware and Applications", Proceedings of the Fifth IEEE International Conference on Pervasive Computing and Communications Workshops (PERCOMW'07), Mar. 2007, 6 pages.
Fiat, et al., "Broadcast Encryption", Advances in Cryptology (CRYPTO'93), Lecture Notes in Computer Science, vol. 773, Jul. 1994, 13 pages.
Neubauer., "An Evaluation of Technologies for the Pseudonymization of Medical Data", In Computer and Information Science, SCI 208, Apr. 2009, pp. 47-60.
Sweeney, Latanya., "Uniqueness of simple demographics in the U.S. population", (Shorter Version: "Simple Demographics Often Identify People Uniquely") LIDAPWP4, Carnegie Mellon University, Laboratory for International Data Privacy, Pittsburgh, PA, May 2000, 34 pages.
Ando, et al., "Parallel analysis for lightweight network incident detection using nonlinear adaptive systems", Proceedings of IFIP International Conference on Network and Parallel Computing, Sep. 18-21, 2007, 7 pages.
Jain, et al., "Data Clustering: A Review", ACM Computing Surveys, vol. 31, No. 3, Sep. 1999, pp. 264-323.
Julisch, K., "Mining Alarm Clusters to Improve Alarm Handling Efficiency", Proceedings of the 17th Annual Computer Security Applications Conference (ACSAC01), Dec. 10-14, 2001, 10 pages.
Lee, W., "A Data Mining Framework for Constructing Features and Models for Intrusion Detection Systems", PhD Thesis, Columbia University, 1999, 193 pages.
Katti, et al., "Collaborating Against Common Enemies", ACM Internet Measurement Conference, Aug. 2005, 23 pages.
Punj, et al., "Cluster Analysis in Marketing Research: Review and Suggestions for Application", Journal of Marketing Research, vol. 20, No. 2, May 1983, pp. 134-148.
Porras, et al., "A Mission-Impact-Based Approach to INFOSEC Alarm Correlation", Proc. Int'l Symp. The Recent Advances in Intrusion Detection, Oct. 2002, 19 pages.
Vaarandi, Risto., "A data clustering algorithm for mining patterns from event logs", 3rd IEEE Workshop on IP Operations and Management, 2003, (IPOM 2003), Oct. 1-3, 2003, 8 pages.
Wedel, et al., "Market Segmentation: Conceptual and Methodological Foundations", Journal of Targeting Measurement and Analysis for Marketing, Aug. 2000, Kluwer Academic Publishers, vol. 9, Issue: 1, 2 pages.
Boggs, et al., "Cross-domain Collaborative Anomaly Detection: So Far Yet So Close", 12th International Symposium on Recent Advances in Intrusion Detection, RAID 2009, Saint-Malo, Brittany, France, Sep. 23-25, 2009, 20 pages.
Zhang, et al., "Highly Predictive Blacklisting", 17th USENIX Security Symposium, San Jose, CA, USA, Jul. 28-Aug. 1, 2008, pp. 107-122.
Sundaramurthy, et al., "Examining Intrusion Prevention System Events from Worldwide Networks", 19th ACM Pre-Conference on Building Analysis Datasets and Gathering Experience Returns for Security (Badgers'12), Raleigh, NC, USA, Oct. 15, 2012, 8 pages.

* cited by examiner

ATTACK NOTIFICATION

BACKGROUND

Computing systems are vulnerable to attacks. Computing systems can be attacked by a number of different types of attacks. An entity that manages a number of computing systems can be overwhelmed by the number of attacks and by the resources consumed in securing against the attacks. The effects of attacks can be resolved after the attack is detected.

DETAILED DESCRIPTION

Figure 1:
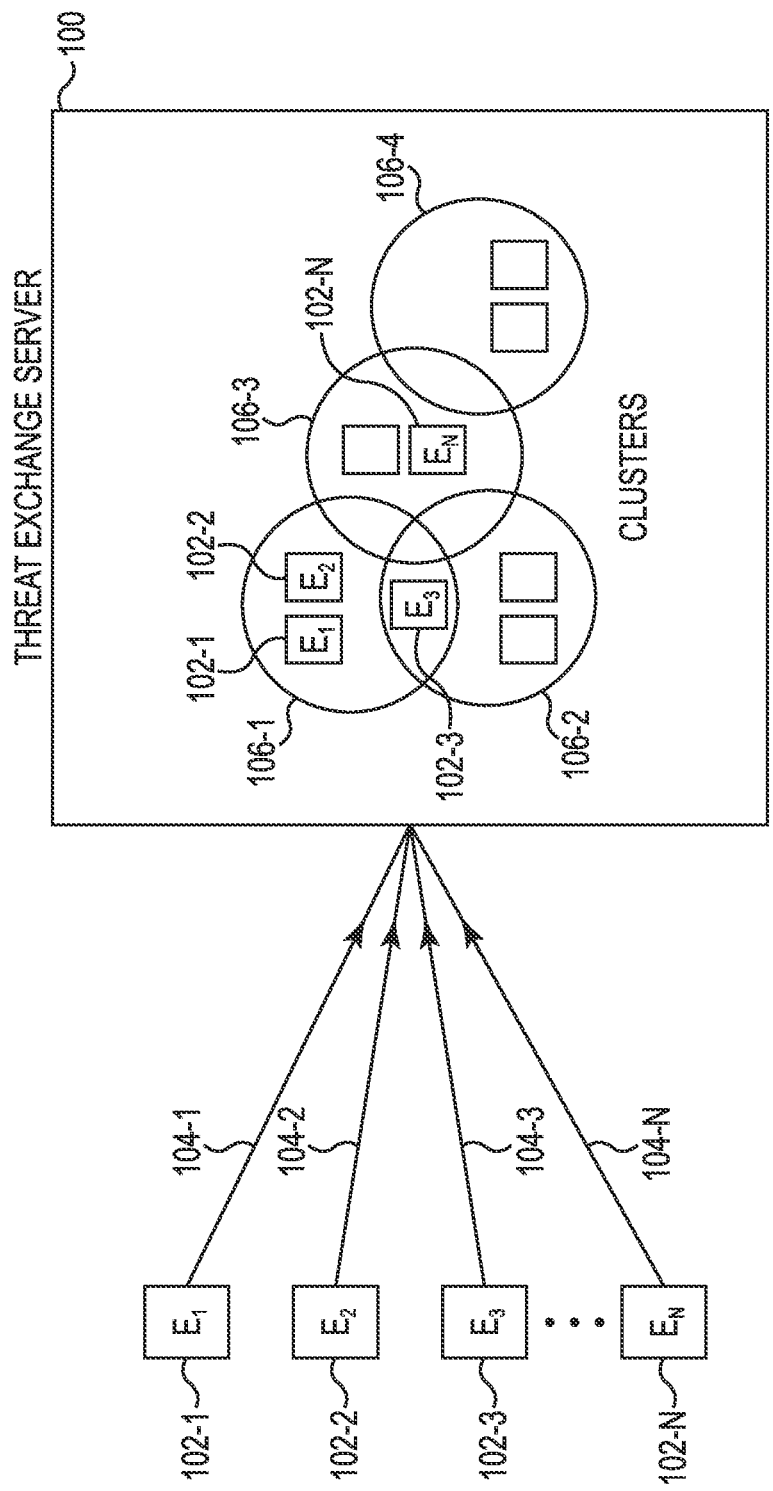
FIG. 1 is a diagram illustrating an example of clustering in a threat exchange server according to the present disclosure.

Receiving an early warning of a security attack on a number of computing devices can be advantageous to an entity that is trying to mitigate the effects of the security attack. A threat exchange server can identify a number of events associated with a security attack, e.g., attack, on a first number of computing devices that are associated with a first entity. As used herein a security attack, e.g., attack, can be the attempted use of one or more exploits against one or more vulnerabilities. The threat exchange server can identify the number of events in data, e.g., security-related data, that is associated with a second number of computing devices that are associated with a second entity to determine whether the second entity is being attacked. The threat exchange server can also determine that the second entity is vulnerable to the first attack when the second entity and the first entity are members of the same cluster. The threat exchange server can send a warning to the second entity of the first attack.

As used herein, a computing device can include a physical component, e.g., a processor, memory, I/O port, bus, etc, and/or machine readable instructions, e.g., software. Computing devices can be associated with entities. An entity can be an organization that offers a number of services through a number of computing devices. For example, an entity can be a banking entity that offers baking related services through a number of computing devices to a number of users over the Internet. An entity is not limited to a banking entity but can include other types of entities.

A number of servers can include services that provide a number of users access to a portion of the entity. For example, the number of services can include services offered over the Internet through a communication link. Services offered over the Internet can provide access for the number of users through a communication link that receives and sends communications between a number of computing devices associated with the entity and a number of computing devices that are associated with a number of users. Access can be permitted access and/or un-permitted access. Permitted access can include receiving and/or processing communications from a user wherein the communications do not cause physical and/or logical damage to the number of computing devices. Un-permitted access can include receiving and/or processing communications from a user that can cause physical and/or logical damage to the number of computing devices. For example, a buffer overload attack can gain un-permitted access to the number of computing devices when the number of computing devices receive and process a number of communications and wherein the buffer overload attack causes physical and/or logical damage through the number of communications. An unrealized attack can be a threat.

An entity can be vulnerable to a number of attacks through a number of communication links that are associated with the number of computing devices. An entity can have limited resources to respond to the number of attacks. For example, an entity can have limited physical resources that are used to detect and/or respond to attacks. Furthermore, the entity can have limited data resources. Moreover, a number of attacks may go undetected as an entity may not recognize malicious activities that are associated with a number of communication links that are associated with the number of computing devices. Data resources can include data that is associated with the number of attacks. Data that is associated with the number of attacks can include data generated by the entity and/or data generated by other entities. Data that is associated with the number of attacks can be data that describes and/or records events and/or evidence that can be associated with the number of attacks. For example, a number of computing devices associated with the entity can record a first step, a second step, and/or a third step, among other events, that are taken by an attack. The computing devices can record the events in a number of logs and/or through other record keeping capabilities.

The data that is associated with the attack can be used to identify the attack and/or different attacks that use some and/or all of the events that are associated with the attack. The number of events associated with the attack can be included in an attack pattern. In a number of examples, the attack pattern can include the number of events in a specific sequence, e.g., order. An attack pattern can also include evidence of an attack. As used herein, evidence of an attack can be any change, influenced by the attack, to the state of a computing device. Evidence of an attack can include effects of the attack. Evidence of an attack can include changes to a filing system associated with a computing device. For example, evidence can be a log that records information regarding an uploaded file. An event can be the uploading of a file wherein the uploading of the file is associated with an attack. The log that records information regarding the uploading can include a directory where the uploading occurred, a time associated with the uploading, and/or a size of the files that were uploaded, among other documentations of the uploading, can be evidence that the uploading took place. Evidence of an attack can include changes to an operating system that is associated with a computing device. Evidence of an attack can include changes to a network structure that is associated with a computing device. However, evidence of an attack is not so limited. An attack can be identified by an attack pattern and/or evidence associated with an attack.

In previous approaches, an attack can be identified when an error occurs and/or when an error is reported. An attack can also be identified by a signature in a file that is infected by the attack. For example, a number of computing devices and/or a number of files that are associated with the number of computing devices can be analyzed to determine whether an error has occurred. However, once an attack is successful then preventive measures cannot be taken. That is, preventive measure against the attack cannot be taken even though preventive measure again future attacks can be taken.

Sharing data, that is associated with an attack, between a number of entities can enhance the data resources and/or the physical resources of a number of entities. The data can be shared through a threat exchange server. The threat exchange server can identify a number of events that are associated with the attack on a number of computing devices that are associated with an entity from the number of entities. As used herein, an attack on one or more computing devices that are associated with an enterprise can be referred to as an attack on the enterprise. The threat exchange server can notify the entity of the attack before the attack is complete which can allow the entity to take preventive and/or remedial measures. A threat exchange server can increase an entity's resources and can allow an entity to identify an attack while the attack is ongoing.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a diagram illustrating an example of clustering in a threat exchange server according to the present disclosure. A threat exchange server 100 can receive data from entity 102-1, entity 102-2, entity 102-3, ..., and/or entity 102-N, e.g., referred to generally as entities 102. The threat exchange server can receive data 104-1 from entity 102-1, data 104-2 from entity 102-2, data 104-3 from entity 102-3, ..., and/or data 104-N from entity 102-N, e.g., referred to generally as data 104. The threat exchange server can divide the number of entities 102 into cluster 106-1, cluster 106-2, cluster 106-3, and/or cluster 106-4, referred to generally as clusters 106.

Data 104 can include messages that are associated with a computing infrastructure, e.g., a number of computing devices and infrastructure that provides communication capabilities between the number of computing devices, that is associated with an entity. For example, data 104 can be in the form of a message informing the threat exchange server 100 that an attack has been detected by entity 102-1 wherein entity 102-1 detected the attack. Data 104 can also be information regarding registers, network traffic, programs, and/or memory, among other records that may be pertinent to determining whether an attack is occurring and/or has occurred.

As used herein, a cluster can be a grouping of entities. The entities 102 can be clustered based on a number of factors, e.g., characteristics, that can define the entities. A clustering of a number of entities can define a relationship between the number of entities. For example, a number of entities can be defined by the number of employees that are associated with an entity, sales associated with an entity, and/or network traffic to and/or from an entity, among other factors. Clusters can define entities that are likely to be the targets of similar attacks. For example, if entity 102-1 and entity 102-2 are large banking entities that have similar characteristics and are part of the same cluster, then attacks that target entity 102-1 are likely to also target entity 102-2.

As illustrated in FIG. 1, cluster 106-1 can group entity 102-1, entity 102-2, and entity 102-3. Cluster 106-2 can group entity 102-3 among other entities. Cluster 106-3 can group entity 102-N among other entities. Cluster 106-4 can group a number of different entities.

The data 104 can be sent to the threat exchange server 100 in real-time. As used herein, real-time can define the transferring of the data 104 as it becomes available. In some examples, the data can be received continually in real-time. In some examples, entities 102 can send data 104 to the threat exchange server 100 in intervals of five minutes, ten minutes, and/or twenty minutes, among other intervals rather than in real-time.

Figure 2:
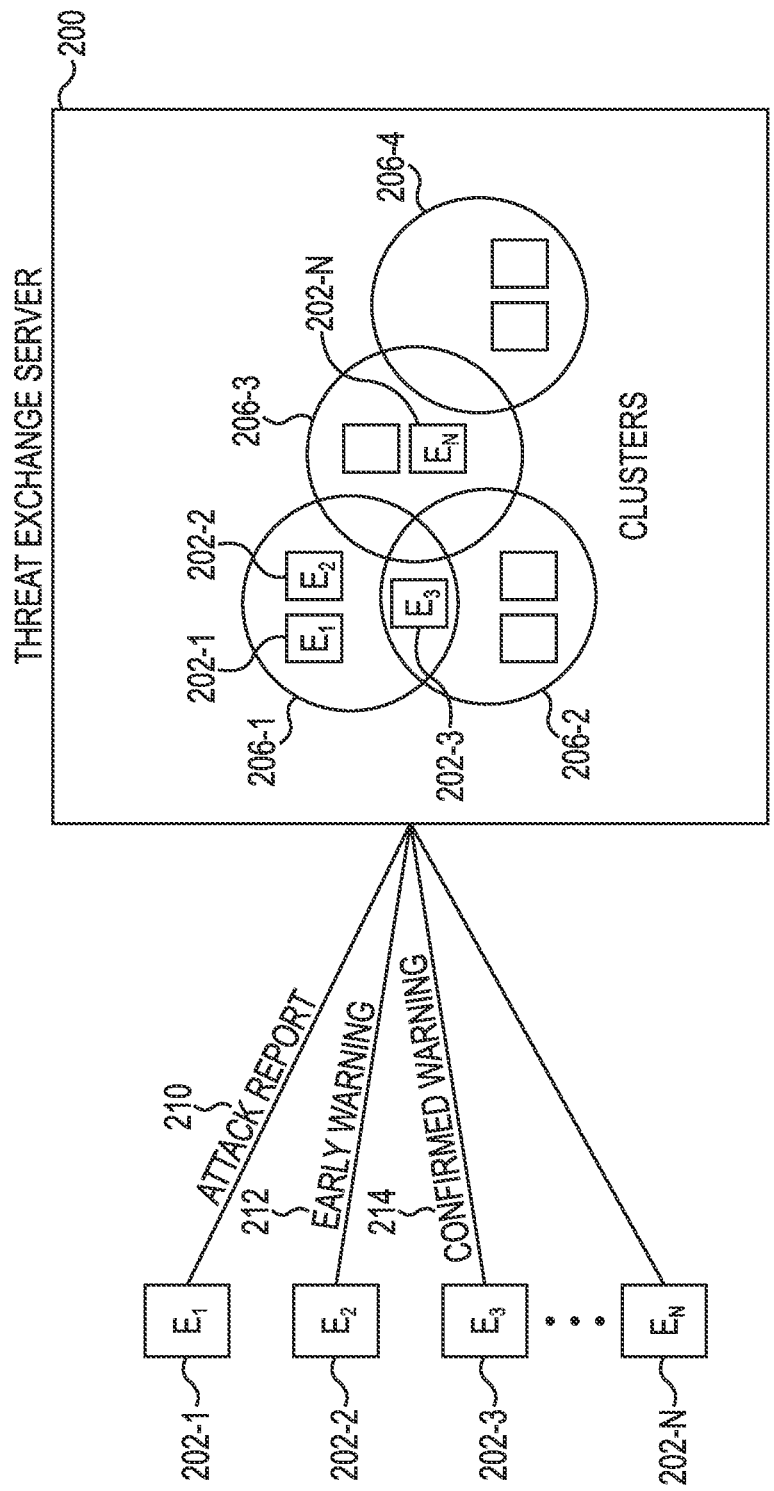
FIG. 2 is a diagram illustrating an example of warning of attacks in a threat exchange server according to the present disclosure.

FIG. 2 is a diagram illustrating an example of warning of attacks in a threat exchange server according to the present disclosure. A threat exchange server 200 can be analogous to a threat exchange server 100 in FIG. 1. The threat exchange server 200 can receive data from entity 202-1, entity 202-2, entity 202-3, ..., and/or entity 202-N, e.g., referred to generally as entities 202, that can be analogous to entity 102-1, entity 102-2, entity 102-3, ..., and/or entity 102-N in FIG. 1, respectively.

The threat exchange server 200 can send a number of warning and/or reports, e.g., 210, 212, 214 to the entities 202. The threat exchange server can divide the number of entities 202 into cluster 206-1, cluster 206-2, cluster 206-3, and/or cluster 206-4, referred to generally as clusters 206, that can be analogous to cluster 106-1, cluster 106-2, cluster 106-3, and/or cluster 106-4 in FIG. 1, respectively.

After receiving data from the entities 202, the threat exchange server 200 can analyze that data to determine whether the data contains evidence of an attack. The threat exchange server 200 can notify an entity of the attack and can warn a number of entities of the attack. For example, the threat exchange server 200 can determine that the data received from entity 202-1 contains evidence of an attack. The threat exchange server 200 can notify entity 202-1 that the attack has been discovered through an attack report 210.

An attack report 210 can contain evidence of an attack and where the evidence is located within the data that entity 202-1 sent to the threat exchange server 200. An attack report 210 can also contain events, e.g., actions, that can be taken by entity 202-1 and/or the threat exchange server 200 to resist future attacks of a similar nature and/or steps that can be taken to correct the effects of the attack.

The threat exchange server 200 can send an early warning 212 to entity 202-2. An early warning 212 can be issued based upon cluster placement, among other reasons. In some examples, an early warning 212 can be issued before an attack is detected in entity 202-2. For example, an early warning 212 can be issued to entity 202-2 based on the inclusion of entity 202-2 in cluster 206-1. The early warning 212 can be issued after an attack has been detected in entity 202-1. An early warning 212 can be issued even though the data associated with entity 202-2 does not include evidence of the attack. That is, early warning 212 can be issued solely based on the inclusion of the entities in a cluster. The early warning 212 can be issued to warn entity 202-2 that other entities that have similar characteristics to entity 202-2 have been attacked.

The early warning 212 issued to entity 202-2 can contain evidence of an attack on entity 202-1 and the evidence placement in the data that entity 202-1 sent to the threat exchange server 200. For example, if a specific sequence of events are associated with an attack, if the data contains evidence of the sequence of events that are associated with an attack, and if entity 202-1 sent the threat exchange server 200 the data, then the threat exchange server can send an early warning 212 to entity 202-2 that contains the data, a portion of the data that entity 202-1 sent to the threat exchange server 200, and/or information regarding the sequence of events. The early warning 212 can also contain steps, e.g., actions, that can be taken by entity 202-2 and/or the threat exchange server 200 to secure a number of computing devices associated with entity 202-2 against attacks that share a portion of the attack pattern with the attack experienced by entity 202-1.

A threat exchange server 200 can also send a confirmed warning 214 to entity 202-3. A confirmed warning 214 can be issued based upon cluster placement and/or an early detection of an attack, among other reasons. Confirmed warning 214 of an attack can consist of the threat exchange server 200 and/or entity 202-3 identifying evidence of the attack that entity 202-1 experienced without identifying all of the evidence of the attack. For example, a confirmed warning 214 can be issued to entity 202-3 based on the inclusion of entity 202-3 in the cluster 206-1 and/or a portion of the evidence of the attack being identified in the data that is associated with entity 202-3. For instance, evidence of an attack on entity 202-1 can include a first event and a second event matching the sequence of events that are associated with the attack. A portion of the evidence can be a first event such that the portion of the evidence can be identified in the data that is associated with entity 202-3. A confirmed warning 214 can be different than an early warning 212 because an early warning 212 does not require any evidence of the attack while a confirmed warning 214 requires some evidence of the attack but not all evidence of the attack.

The confirmed warning 214 can be issued after the attack has been detected in the entity 202-1. The confirmed warning 214 can be issued even though the data associated with entity 202-3 does not include all of the evidence associated with the attack and/or the events that are associated with the attack. The confirmed warning 214 can be issued to warn entity 202-3 that other entities that have similar characteristics to entity 202-3 have experienced the attack.

Figure 3:
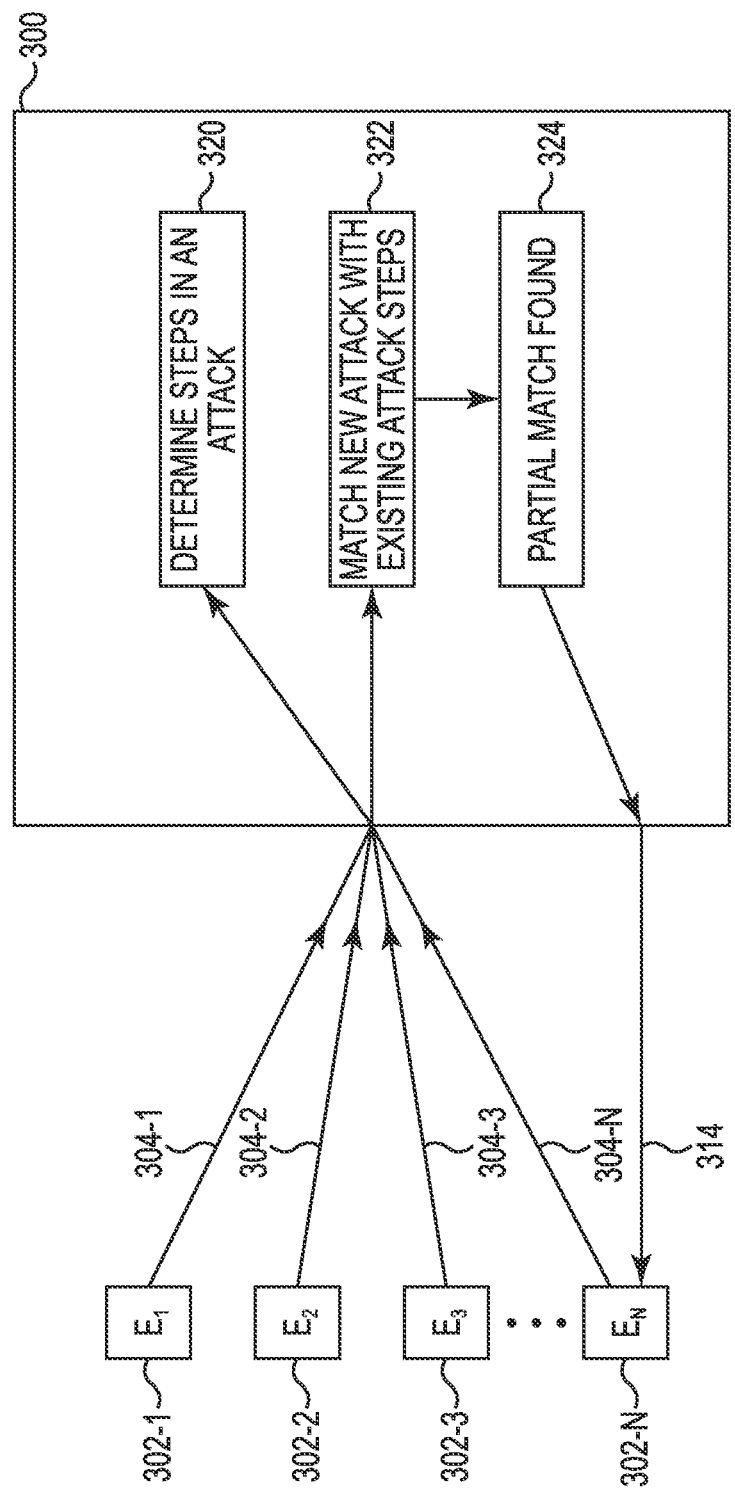
FIG. 3 is a diagram illustrating an example of a threat exchange server according to the present disclosure.

FIG. 3 is a diagram illustrating an example of a threat exchange server according to the present disclosure. The threat exchange server 300 can be analogous to the threat exchange server 100 in FIG. 1. The threat exchange server 300 can receive data from entity 302-1, entity 302-2, entity 302-3, . . . , and/or entity 302-N, e.g., referred to generally as entities 302, that can be analogous to entity 102-1, entity 102-2, entity 102-3, . . . , and/or entity 102-N in FIG. 1, respectively. The threat exchange server 300 can analyze the data to determine whether there is evidence of an attack. The threat exchange server can issue a confirmed warning 314 that can be analogous to the confirmed warning 214 in FIG. 2.

The threat exchange server 300 can receive data 304-1 from entity 302-1, data 304-2 from entity 302-2, data 304-3 from entity 302-3 and data 304-N from entity 302-N, e.g., referred to generally as data 304. At 320, the threat exchange server 300 can analyze the data 304 to identify an attack. The attack can be identified based on evidence of the attack and/or events associated with the attack. Evidence of the attack can be the sequence of a number of events that can be associated with an attack. For example, an attack can be associated with an event that copies a file onto a computing device that is associated with entity 302-1. The copied file on the computing device can be evidence of the copying and/or of the attack. Furthermore, evidence can include, for example, a log that defines the access that a user that is associated with the attack had to a directory where the file was copied, privileges associated with the copied file, and/or network traffic during the time the copying took place, among other forms of evidence. The events associated with the attack and/or the evidences of the attack can comprise an attack pattern. The attack pattern can define the attack and can be used to identify the attack. A portion of the attack pattern can also be used to identify the attack.

At 322, the attack pattern can be used to determine whether the entities 302 are being attacked and/or have experienced the attack. For example, data 304 associated with the entities 304 can be analyzed to determine whether the attack pattern and/or a portion of the attack pattern is present in the data 304. At 323, an attack can be identified when the attack pattern is identified in data 304-N that is associated with entity 302-N.

The attack pattern and/or the portion of the attack pattern can be identified when the events associated with the attack and/or the evidence of the attack on entity 302-N can be correlated with the events associated with the attack and/or the evidence of the attack on entity 302-1. For example, if evidence of an attack include a first file, a second file, and a third file being located in a first directory in a computing device that is associated with entity 302-1 and if the first file, the second file, and the third file are located in a second directory in a computing device that is associated with entity 302-2, then the first file, the second file, and the third file in the first directory can be correlated with the first file, the second file, and the third file in the second directory even though differences may exists between the first directory and the second directory. The first file, the second file, and the third file in the second directory can be evidence of the attack. Other types of correlations can be used to correlate evidence and/or events that are associated with an attack.

The threat exchange server 300 can send the confirmed warning 314 to the entity 302-N when a partial match is found in data 304-N that is associated with the entity 302-N. In a number of examples, threat exchange server 300 can send an early warning when there are reasons to believe that the entity 302-N is likely to be the target of an attack that can be correlated with the attack experienced by entity 302-1. The threat exchange server 300 can also send an attack report when a match of the threat pattern, e.g., the entire pattern, is identified in the data 304-1 that is associated with entity 302-1. For example, an attack report can be sent when an attack is confirmed.

Figure 4:
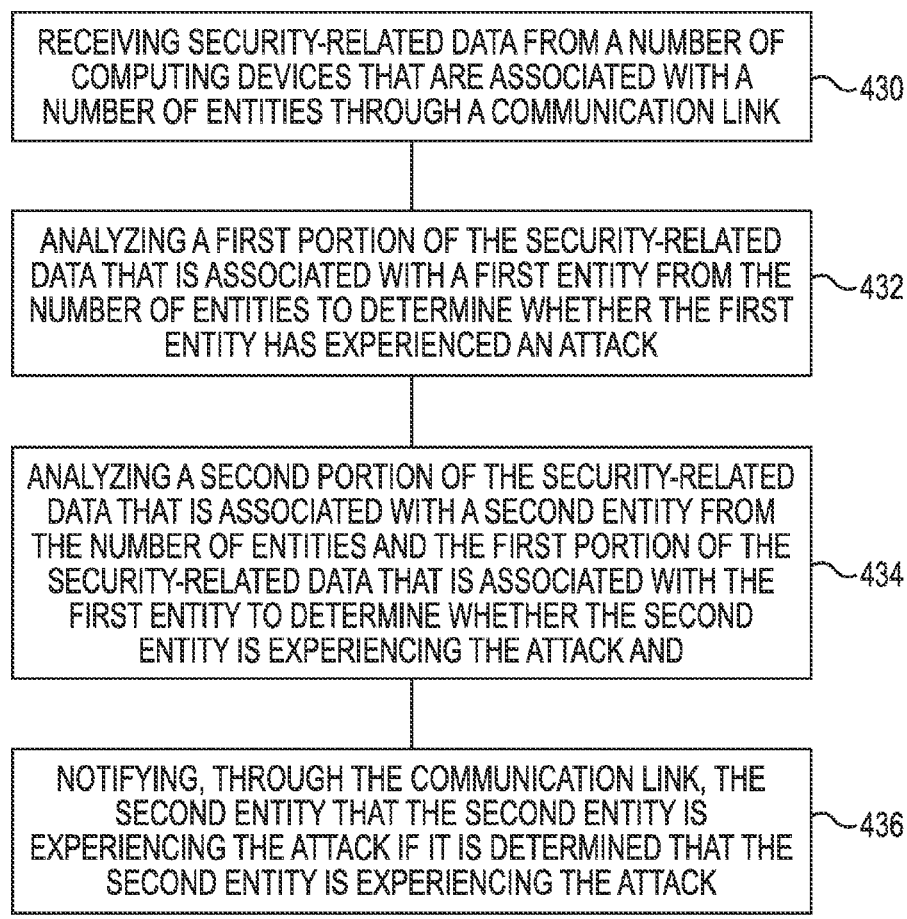
FIG. 4 is a flow chart illustrating an example of a method for attack notification according to the present disclosure.

FIG. 4 is a flow chart illustrating an example of a method for attack notification according to the present disclosure. At 430, security-related data can be received from a number of computing devices that are associated with a number of entities through a communication link. The security-related data can be received at a threat exchange server. The security-related data can be data from which a pattern that is associated with an attack can be identified. For example, security-related data can be in the form of a number of logs that record network traffic and/or file system access. Security-related data can also include files, applications, and/or file system structures, among other types of security-related data. A communication link can be a logical and/or of physical connection between a first number of computing devices that are associated with the threat exchange server and a second number of computing devices that are associated with an entity.

At 432, a first portion of the security-related data that is associated with a first entity from the number of entities can be analyzed to determine whether the first entity has experienced an attack. A first entity can send the first portion of the security-related data to the threat exchange server. The first portion of the security-related data can be sent before and/or after the first entity identifies an attack pattern. The threat exchange server can examine the first portion of the security-related data to confirm the identification of the first attack pattern. In a number of examples, the first entity can send the first portion of the security-related data without having examined the first portion of the security-related data. The threat exchange server can perform a first examination of the first portion of the security-related data to determine whether the first attack pattern is present in the security-related data, wherein the threat exchange server identifies the first attack based on a previously acquired attack pattern. Security-related data can include data that is received and/or sent in real-time and/or data that constitutes a history, e.g., historical data, of the first device, e.g., the history can be associated with a number of events that are associated with a number of computing devices that are associated with the first entity.

The threat exchange server can provide a known solution to the first entity. A known solution can include steps, e.g., preventive measures, that can be taken on a number of computing devices to prevent future attacks. A known solution can also include steps that can be taken to clean the effects of the attack. The steps can be taken by the first entity and/or the threat exchange server. The automated deployment of the known solution can provide real-time defense against the attack.

At 434, a second portion of the security-related data that is associated with a second entity from the number of entities and the first portion of the security-related data that is associated with the first entity can be analyzed to determine whether the second entity is experiencing the attack. The portion of the security-related data that is associated with the first entity can be analyzed to formulate the pattern that is associated with the attack. For example, when security-related data is received in real-time, then the pattern that is associated with the attack can be formulated in real-time. A first event that is associated with the pattern can be identified at a first time, a second event can be identified at a second time, a third event can be identified at a third time, and a fourth event can be identified at a fourth time, for example. The attack can be identified after the second event, for example, without having identified all four events that are associated with the first attack pattern. The threat exchange server can analyze the security-related data that is associated with the second entity to determine if evidence of the first event and/or the second event that are associated with the attack can be found in the security-related data that is associated with the second entity.

At 436, the second entity can be notified, through the communication link, that the second entity is experiencing the attack if it is determined that the second entity is experiencing the attack. If evidence of the first event and/or the second event are identified in the second portion of the security-related data that is associated with the second entity, then the security exchange server can notify the second entity by issuing a confirmed warning.

Figure 5:
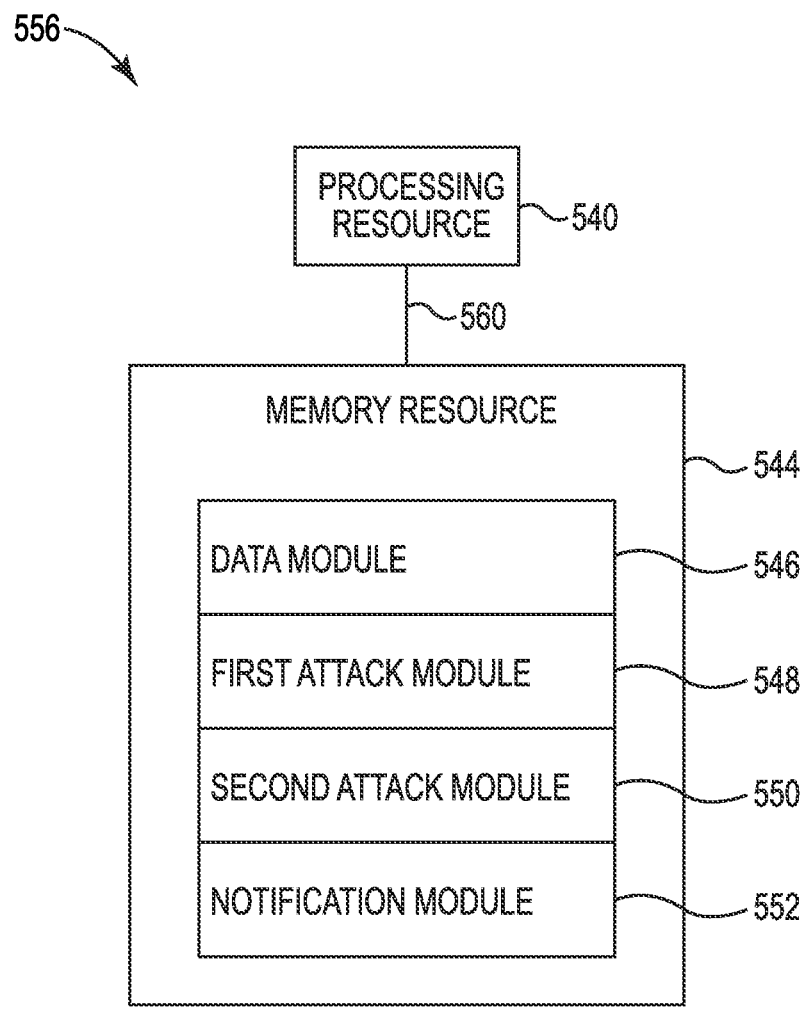
FIG. 5 is a diagram illustrating an example of a computing system according to the present disclosure.

FIG. 5 is a diagram illustrating an example of a computing system according to the present disclosure. The computing system 556 can utilize software, hardware, firmware, and/or logic to perform a number of functions.

The computing system 556 can be a combination of hardware and program instructions configured to perform a number of functions, e.g., actions. The hardware, for example, can include one or more processing resources 540 and other memory resources 544, etc. The program instructions, e.g., machine-readable instructions (MRI), can include instructions stored on memory resource 544 to implement a particular function, e.g., an action such as customer edge device problem identification.

The processing resources 540 can be in communication with the memory resource 544 storing the set of MRI executable by one or more of the processing resources 540, as described herein. The MRI can also be stored in a remote memory managed by a server and represent an installation package that can be downloaded, installed and executed. A computing device 556, e.g., server, can include memory resources 544, and the processing resources 540 can be coupled to the memory resources 544 remotely in a cloud computing environment.

Processing resources 540 can execute MRI that can be stored on internal or external non-transitory memory 544. The processing resources 540 can execute MRI to perform various functions, e.g., acts, including the functions described herein among others.

As shown in FIG. 5, the MRI can be segmented into a number of modules, e.g., a data module 546, a first attack module 548, a second attack module 550, and a notification module 552, that when executed by the processing resource 540 can perform a number of functions. As used herein a module includes a set of instructions included to perform a particular task or action. The number of modules 546, 548, 550, and 552 can be sub-modules of other modules. For example, the data module 546 and the first attack module 548 can be sub-modules and/or contained within a single module. Furthermore, the number of modules 546, 548, 550, and 552 can comprise individual modules separate and distinct from one another.

In the example of FIG. 5, a data module 546 can comprise MRI that are executed by the processing resources 540 to receive data from a number of computing devices that are associated with a number of entities. The data can be received at a threat exchange server through a communication link. The data can be data that is associated with the number of computing devices and/or data that is associated with a number of computing infrastructures that are associated with the entities.

A first attack module 548 can comprise MRI that are executed by the processing resources 540 to identify an attack on a first entity. Identifying an attack on a first entity can include identifying an attack pattern on the number of computing devices associated with the first entity. The identification can be a partial identification and/or a full identification. A partial identification can include, for example, the threat exchange server evaluating the data that is associated with the first entity and determining that there is a probability that is higher than 50 percent that the first entity is being attacked. If the first entity has historically been an early target of attacks, then an early warning can be sent to a number of entities.

Furthermore, if the threat exchange server identifies an anomaly in the data that is associated with the first entity, then the threat exchange server can issue an early warning to the number of entities. An anomaly can include, for example, a higher volume of network traffic than what has been historically experienced by the first entity originating form a single source. The early warning can be sent to the number of entities through a communication link.

If a cluster of entities have historically been the target of attacks at the same time, if only one of those entities is currently being attacked, and if the other entities are not currently being attacked, then it can be determined that the entity that is experiencing the attack is the focus of a targeted attack that indicate a severe attach as compared to attacks that distribute their resources over a number entities. The entity can be notified of the concentrated attack through an attack report, an early warning, and/or a confirm warning based on the evidence that can be compiled of the concentrated attack.

A second attack module 550 can comprise MRI that are executed by the processing resources 540 to identify the attack on a second entity. A first entity, a second entity, a third entity, and/or a fourth entity can be included in a cluster, or another number of entities. If an attack is identified in the first entity, then a warning and/or an attack report can be sent to the second entity, the third entity, and/or the fourth entity. The second entity, the third entity, and the fourth entity can be ranked based on their similarity to the first entity. A warning and/or an attack report can be sent to the entity based on the rakings. The rankings can take into account the severity of an attack, the duration of the attack, the number of patterns associated with the attack, and/or the number of organizations that are experiencing the attack. A severity of an attack can be judged based on the resources needed to prevent the attack and/or solve the effects of the attack. A severity of an attack can also be judged based on the damage that the attack inflicts on a number of computing devices associated with the first entity. A severity can be judged based on the cost associated with the damage that the attack inflicts, among other standards of severity. Duration can be the duration of an attack on a single entity and/or a number of entities. A number of patterns and/or the complexity of the pattern can define the complexity of the attack. A number of organizations under attack can define the scope of the attack. For example, a warning can be sent to the first entity, the second entity, the third entity, and/or the fourth entity when the attack affects a number of organizations.

A notification module 552 can comprise MRI that are executed by the processing resources 540 to notify the second entity of an attack. The second entity can be identified by the threat exchange server when the attack pattern has been identified in the data that is associated with the second entity. In a number of examples, the attack can target a number of other entities and the attack can be discovered in the number of other entities. The notifications that are sent to the second entity and the number of other entities can be ordered based on the relationship between the second entity and first entity and the relationship between the number of other entities and the first entity. For example, if a number of employees that are associated with the second entity are closer to a number of employees that are associated with the first entity than a number of employees that are associated with each of the number of other entities, then a notification can be sent to the second entity before it is sent to the number of other entities.

A memory resource 544, as used herein, can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The memory resource 544 can be integral or communicatively coupled to a computing device in a wired and/or wireless manner. For example, the memory resource 544 can be an internal memory, a portable memory, and a portable disk, or a memory associated with another computing resource, e.g., enabling MRIs to be transferred and/or executed across a network such as the Internet.

The memory resource 544 can be in communication with the processing resources 540 via a communication path 560. The communication path 560 can be local or remote to a machine, e.g., a computer, associated with the processing resources 540. Examples of a local communication path 560 can include an electronic bus internal to a machine, e.g., a computer, where the memory resource 544 is one of volatile, non-volatile, fixed, and/or removable storage medium in communication with the processing resources 540 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 560 can be such that the memory resource 544 is remote from a processing resource, e.g., processing resources 540, such as in a network connection between the memory resource 544 and the processing resource, e.g., processing resources 540. That is, the communication path 560 can be a network connection. Examples of such a network connection can include local area network (LAN), wide area network (WAN), personal area network (PAN), and the Internet, among others. In such examples, the memory resource 544 can be associated with a first computing device and the processing resources 540 can be associated with a second computing device, e.g., a Java server. For example, processing resources 540 can be in communication with a memory resource 544, wherein the memory resource 544 includes a set of instructions and wherein the processing resources 540 are designed to carry out the set of instructions.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for attack notification comprising:
receiving, through a communication link, security-related data from each of a plurality of computing devices that are each associated with one of a plurality of entities, each entity being a separate organization;
clustering, by a threat exchange server, the plurality of entities into groups based on characteristics that define the plurality of entities;
analyzing, by the threat exchange server, a first portion of the security-related data that is associated with a first entity from the plurality of entities to determine whether the first entity has experienced an attack;
determining that the first entity experienced an attack;
without evidence of the attack on a second entity of the plurality of entities, sending, through the communication link, an early warning to the second entity based on cluster placement of both the first entity and the second entity;
analyzing, by the threat exchange server, a second portion of the security-related data that is associated with the second entity and the first portion of the security-related data that is associated with the first entity to identify partial evidence of the attack on the second entity; and
in response to identifying partial evidence of the attack on the second entity, sending a confirmed warning, through the communication link, to the second entity, wherein the early warning and the confirmed warning are sent based on rankings, and wherein the rankings are based on at least one of:
a severity of the attack;
a duration of the attack;
a number of patterns associated with the attack; or
a number of entities that are experiencing the attack.

2. The method of claim 1, wherein receiving security-related data from the plurality of computing devices includes receiving security-related data that is associated with computing infrastructures that are associated with the plurality of entities.

3. The method of claim 1, wherein receiving security-related data includes receiving security-related data in real-time.

4. The method of claim 1, wherein analyzing the second portion of the security-related data that is associated with the second entity and the first portion of the security-related data that is associated with the first entity includes:
identifying evidence of the attack in the first portion of the security-related data that is associated with the attack; and
determining whether the evidence is present in the second portion of the security-related data that is associated with the attack.

5. The method of claim 1, wherein the attack is a first attack, the method further comprising:
determining that the second entity is experiencing a second attack that is associated with evidence produced by the first attack; and
notifying, through the communication link, the second entity that the second entity is experiencing the second attack.

6. A non-transitory machine-readable medium storing instructions for attack notification executable by a machine to cause the machine to:
receive historical security-related data that includes an attack pattern from a number of computing devices that are associated with a number of entities through a communication link, wherein the number of entities is clustered into a number of groups based on characteristics that define the number of entities;
identify an attack on a first entity from the number of entities by examining a portion of the historical security-related data and a clustered group that is associated with the first entity;
in response to the attack identification on the first entity, but without evidence of the attack on a second entity, send an early warning to the second entity from the number of entities;
formulate a pattern that is associated with the attack;
receive updated security-related data from the number of computing devices that are associated with the number of entities;
analyze the updated security-related data to determine whether the pattern is present in the updated security-related data; and
send a confirmed warning to the second entity, through the communication link, that the second entity is being attacked in response to a partial evidence of the attack on the second entity including a determination that the pattern is present in a portion of the updated security related data that is associated with the second entity and the second entity is associated with a same clustered group as the first entity, wherein the early warning and the confirmed warning are sent based on rankings, and wherein the rankings are based on at least one of:
a severity of the attack;
a duration of the attack;
a number of patterns associated with the attack; or
a number of entities that are experiencing the attack.

7. The medium of claim 6, wherein the instructions executable to identify the attack on the first entity include instructions executable to identify evidence of the attack that comprises the pattern in the portion of the historical security-related data that is associated with the first entity.

8. The medium of claim 7, wherein the instructions executable to determine whether the pattern is present in the updated security-related data include instructions executable to determine whether a portion of the evidence that is associated with the attack on the first entity is present in the portion of the updated security-related data that is associated with the second entity.

9. The medium of claim 6, wherein the instructions executable to send a confirmed warning to the second entity, through the communication link, that the second entity is being attacked include instructions executable to notify the second entity and a number of other entities that are being attacked in a specific order wherein the specific order is based on a relationship between the second entity and the first entity and a relationship between the number of other entities and the first entity.

10. The medium of claim 6, wherein the instructions executable to send a confirmed warning to the second entity that it is being attacked include instructions executable to send the second entity information that is associated with the attack.

11. A system for attack notification, comprising:
a hardware processing resource in communication with a memory resource, wherein the memory resource includes a set of instructions, executable by the processing resource to:
receive, through a communication link, security-related data from each of a plurality of computing devices that are each associated with one of a plurality of entities, each entity being a separate organization;

analyze the security-related data to formulate a pattern that is associated with an attack on a first entity from the plurality of entities;

perform preventive actions for at least one computing device that is associated with a second entity from the plurality of entities in response to the first entity and the second entity being in a same cluster of entities, wherein each cluster includes a group of entities with similar defining characteristics;

wherein the preventative actions include:

sending an early warning to the second entity based on the formulated pattern but without evidence of the attack on the second entity; and sending a confirmed warning to the second entity based on the formulated pattern and in response to receiving partial evidence of the attack on the second entity; and wherein the early warning and the confirmed warning are sent based on rankings, and wherein the rankings are based on at least one of:

a severity of the attack;

a duration of the attack;

a number of patterns associated with the attack; or a number of entities that are experiencing the attack.

12. The system of claim 11, wherein the instructions are executable to determine whether the first entity and the second entity are in the same cluster of entities and to determine whether the first entity and the second entity have similar characteristics that indicate that the second entity will experience the attack.

13. The system of claim 11, wherein the instructions executable to perform the preventive actions include instructions executable to:

receive information from at least one computing device that is associated with the first entity pertaining to a response to a first attack; and based on the received information, perform the preventive actions on at least one computing device that is associated with the second entity to prevent the attack on the second entity.

14. The system of claim 11, wherein the instructions executable to perform the preventive actions include instructions to prevent attack actions that are associated with the attack from being implemented on the plurality of computing devices that are associated with the second entity.

15. The system of claim 14, wherein the instructions executable to perform the preventive actions for the plurality of computing devices include instructions to perform the preventive actions in response to determining that:

the first entity and the second entity are part of the same cluster of entities; and a portion of the pattern is present in the security-related data that is received in real-time and that is associated with the second entity.

16. The method of claim 4, wherein evidence of the attack includes a first event of the first entity and a second event of the first entity matching a sequence of events associated with the attack.

17. The method of claim 1, including sending, through the communication link, the confirmed warning to the second entity in response to a determination that there is a probability that is higher than 50 percent that the first entity is being attacked.

18. The method of claim 1, wherein the early warning includes data indicating actions that can be taken by the second entity to resist attacks.

19. The medium of claim 6, wherein the instructions executable to notify the second entity include instructions executable to send an attack report to the second entity that includes actions to be taken by the second entity to correct effects of the attack.

20. The method of claim 1, further comprising:

ranking, for the first entity and based on characteristics that define the plurality of entities, each other entity included in a group that includes the first entity; and selecting, for early warning, the second entity based on the ranking.

* * * * *